US010341650B2

(12) United States Patent
Mammou et al.

(10) Patent No.: US 10,341,650 B2
(45) Date of Patent: Jul. 2, 2019

(54) EFFICIENT STREAMING OF VIRTUAL REALITY CONTENT

(71) Applicants: Advanced Micro Devices, Inc., Sunnyvale, CA (US); ATI Technologies ULC, Markham (CA)

(72) Inventors: Khaled Mammou, Vancouver (CA); Ihab Amer, Markham (CA); Gabor Sines, Markham (CA); Lei Zhang, Markham (CA); Layla A. Mah, Lowell, MA (US); Guennadi Riguer, Markham (CA); David Glen, Markham (CA)

(73) Assignees: ATI TECHNOLOGIES ULC, Markham, Ontario (CA); ADVANCED MICRO DEVICES, INC., Sunnyvale, CA (US)

( * ) Notice: Subject to any disclaimer, the term of this patent is extended or adjusted under 35 U.S.C. 154(b) by 237 days.

(21) Appl. No.: 15/130,873

(22) Filed: Apr. 15, 2016

(65) Prior Publication Data

US 2017/0302918 A1    Oct. 19, 2017

(51) Int. Cl.
*H04N 19/103*    (2014.01)
*H04N 19/167*    (2014.01)
*H04N 19/597*    (2014.01)
*H04N 19/162*    (2014.01)
*H04N 19/124*    (2014.01)
*G06K 9/00*    (2006.01)
*H04N 19/17*    (2014.01)

(52) U.S. Cl.
CPC ......... *H04N 19/103* (2014.11); *G06K 9/0061* (2013.01); *H04N 19/124* (2014.11); *H04N 19/162* (2014.11); *H04N 19/167* (2014.11); *H04N 19/17* (2014.11); *H04N 19/597* (2014.11)

(58) Field of Classification Search
CPC .. H04N 19/103; H04N 19/124; H04N 19/162; H04N 19/167; H04N 19/17; H04N 19/597; G06K 9/0061
USPC ..................................................... 375/240.03
See application file for complete search history.

(56) References Cited

U.S. PATENT DOCUMENTS

| 6,625,215 B1 | 9/2003 | Faryar et al. |
| 2002/0141650 A1* | 10/2002 | Keeney ................ H04N 19/115 382/239 |
| 2006/0023787 A1 | 2/2006 | Cai et al. |
| 2014/0219331 A1 | 8/2014 | Pai et al. |

(Continued)

FOREIGN PATENT DOCUMENTS

WO    2015-138008 A1    9/2015

*Primary Examiner* — William C Vaughn, Jr.
*Assistant Examiner* — Jae N Noh
(74) *Attorney, Agent, or Firm* — Volpe and Koenig, P.C.

(57) ABSTRACT

Systems, methods and apparatuses of processing data of a VR system are disclosed that comprise receiving tracking information which includes at least one of user position information and eye gaze point information. One or more processors may be used to predict, based on the user tracking information, a user viewpoint of a next frame of a sequence of frames of video data to be displayed. Using the prediction, a portion of the next frame of video data to be displayed is rendered at an estimated location in the next frame. A corresponding matching portion in a previously encoded frame is determined based on the estimated location of the portion in the next frame and the portion of the next frame of video data is encoded.

18 Claims, 7 Drawing Sheets

(56) References Cited

U.S. PATENT DOCUMENTS

| | | | |
|---|---|---|---|
| 2015/0071339 A1* | 3/2015 | Wang | H04N 19/176 |
| | | | 375/240.02 |
| 2015/0092856 A1 | 4/2015 | Mammou et al. | |
| 2015/0235453 A1 | 8/2015 | Schowengerdt et al. | |
| 2016/0227248 A1* | 8/2016 | Choi | H04N 19/29 |
| 2017/0295373 A1* | 10/2017 | Zhang | H04N 19/136 |
| 2017/0324975 A1* | 11/2017 | Lee | H04N 19/61 |

* cited by examiner

EFFICIENT STREAMING OF VIRTUAL REALITY CONTENT

TECHNICAL FIELD

This application is generally directed to Virtual Reality (VR) systems, apparatuses and methods, and in particular, to high visual quality video display and low latency wireless VR systems and methods which exploit tracking information and camera information to guide motion searching and encoding decisions, improving encoding efficiency while decreasing the memory bandwidth requirements and processing time.

BACKGROUND

VR systems use interactive applications to simulate different types of environments. VR systems seek to provide a realistic visual experience to immerse users in these simulated environments and artificially create sensory experiences of the users. The visual experience is made more realistic by displaying what users expect to see, in real time, throughout their experience.

The realistic experience is facilitated by displaying the video data with high visual quality (e.g., high definition) and low latency (the amount of time for the data to traverse VR sub-systems and/or VR devices). When the visual quality is lacking or latency of the data increases, the realism of the visual experience may be negatively affected.

BRIEF DESCRIPTION OF THE DRAWINGS

A more detailed understanding may be had from the following description, given by way of example in conjunction with the accompanying drawings wherein.

DETAILED DESCRIPTION

A method of processing VR content is disclosed that comprises receiving tracking information that includes at least one of user position information and eye gaze point information. The method also comprises using one or more processors to predict, based on the user tracking information, a user viewpoint of a next frame of a sequence of frames of video data to be displayed and render a portion of the next frame of video data to be displayed at an estimated location in the next frame using the prediction. The method also comprises using the one or more processors to determine, based on the estimated location of the portion in the next frame, a corresponding matching portion in a previously encoded frame and encode the portion of the next frame of video data.

The method may further comprise using the one or more processors to encode the portion of the next frame of video data using a coding mode without comparing the coding mode to another coding mode.

The method may further comprise using the one or more processors to encode the portion of the next frame of video data using a coding mode without evaluating the coding mode based on a rate distortion (RD) cost to encode the portion of the next frame.

The method may further comprise using the one or more processors to encode the portion of the next frame of video data using the same coding mode as the coding mode used to encode the corresponding matching portion of the previous frame.

The method may further comprise using the one or more processors to use a predetermined coding mode to encode the portion of the next frame of video data based on the estimated location the portion of the next frame of video data.

The predetermined coding mode may be a coding mode selected from a plurality of predetermined coding modes stored in a prediction mode map, each of the plurality of predetermined coding modes mapped to a corresponding portion of a frame for encoding the corresponding portion of the frame at the estimated location.

Each of the sequence of frames of video data may include a left view of a frame of video data and a right view of the frame of video data acquired at different angles and displayed together and the encoded portion of the next frame of video data is one of a left view encoded portion and a right view encoded portion and the method may further comprise using the one or more processors to map the encoded portion of the next frame of video data from the one of the left view and right view to a matching portion of video data in the other of the left view and right view and encode the matching portion of video data in the other of the left view and right view.

Each of the sequence of frames of video data comprises one or more unused regions. The method may further comprise using the one or more processors to encode the one or more unused regions using one of: (i) a pre-determined encoding mode; and (ii) the mode used to encode the previous region.

The method may further comprise using the one or more processors to allocate different values to QPs used to encode portions of the next frame according to corresponding map regions characterized by their proximity to a user eye gaze point based on received information comprising at least one of (i) received region of interest (ROI) information, (ii) depth information, (iii) user gaze point information and (iv) variance of texture information. The one or more processors may also be used to weight the allocation of the different QP values based on the received information to provide updated QP values for the portions of the next frame and update a QP value used to encode the portion of the next frame of video data the QP based on the weighted allocation of the different QP values.

A processor device for processing Virtual Reality (VR) content is provided that comprises memory configured to store data and one or more processor in communication with the memory and configured to receive tracking information including at least one of user position information and eye gaze point information. The one or more processors are also configured to predict, based on the user tracking information, a user viewpoint of a next frame of a sequence of frames of video data to be displayed and render a portion of the next frame of video data to be displayed at an estimated location in the next frame using the prediction. The one or more processor are also configured to determine, based on the estimated location of the portion in the next frame, a corresponding matching portion in a previously encoded frame and encode the portion of the next frame of video data.

The one or more processor may further be configured to encode the portion of the next frame of video data using a coding mode without comparing the coding mode to another coding mode.

The one or more processor may further be configured to encode the portion of the next frame of video data using a coding mode without evaluating the coding mode based on a rate distortion (RD) cost to encode the portion of the next frame.

The one or more processor may further be configured to encode the portion of the next frame of video data using the same coding mode as the coding mode used to encode the corresponding matching portion of the previous frame.

The one or more processor may further be configured to encode the portion of the next frame of video data using a predetermined coding mode based on the estimated location the portion of the next frame of video data.

The predetermined coding mode may be a coding mode selected from a plurality of predetermined coding modes stored in a prediction mode map, each of the plurality of predetermined coding modes mapped to a corresponding portion of a frame for encoding the corresponding portion of the frame at the estimated location.

Each of the sequence of frames of video data may comprise a left view of a frame of video data and a right view of the frame of video data acquired at different angles and displayed together and the encoded portion of the next frame of video data is one of a left view encoded portion and a right view encoded portion and the one or more processor may further be configured to map the encoded portion of the next frame of video data from the one of the left view and right view to a matching portion of video data in the other of the left view and right view and encode the matching portion of video data in the other of the left view and right view.

Each of the sequence of frames of video data may comprise one or more unused regions and the one or more processor are further configured to encode the one or more unused regions using one of: (i) a pre-determined encoding mode; and (ii) the mode used to encode the previous region.

The one or more processor may further be configured to allocate different values to QPs used to encode portions of the next frame according to corresponding map regions characterized by their proximity to a user eye gaze point based on received information comprising at least one of (i) received region of interest (ROI) information, (ii) depth information, (iii) user gaze point information and (iv) variance of texture information, weight the allocation of the different QP values based on the received information to provide updated QP values for the portions of the next frame and update a QP value used to encode the portion of the next frame of video data the QP based on the weighted allocation of the different QP values.

A tangible, non-transitory computer readable medium is disclosed that comprises instructions for causing a computer to execute processing data of a VR system. The instructions comprise receiving tracking information that include at least one of user position information and eye gaze point information. The instructions also comprise predicting, based on the user tracking information, a user viewpoint of a next frame of a sequence of frames of video data to be displayed and rendering a portion of the next frame of video data to be displayed at an estimated location in the next frame using the prediction. The instructions further comprise determining, based on the estimated location of the portion in the next frame, a corresponding matching portion in a previously encoded frame and encoding the portion of the next frame of video data.

The instructions may further comprise encoding the portion of the next frame of video data using a coding mode without comparing the coding mode to another coding mode.

Conventional VR systems, apparatuses and methods do not provide the high visual quality and the low latency for facilitating a continuous realistic VR system. The present application describes VR systems, apparatuses (e.g., VR client and VR server) and methods that exploit specificities of VR applications, such as tracking information and camera information to guide motion searching and encoding decisions and provide a high visual quality (e.g., high-resolution, high-framerate) of video data (including a plurality of frames) with low latency.

The terms "region" and "portion" are used interchangeably to mean a number of pixels or group of pixels (e.g., block, macroblock, and the like) of a frame or picture. A portion or region of a frame may include, but is not limited to fields, slices, blocks, macroblocks and coding tree unit (CTU). A portion or region of a frame may also be the frame or picture. As used herein, portions or regions of a frame may include terms common to multiple video compression standards, (e.g., slices, fields, lines) as well as terms used in one video compression standard (e.g., macroblocks used in Moving Pictures Experts Entertainment Group MPEG standards) corresponding or conceptually corresponding to other terms used in another standard (e.g., coding tree unit (CTU) used in High Efficiency Video Coding (HEVC) standards).

The present application discloses systems, apparatuses and methods which use tracking information (e.g., head position and orientation, user eye gaze point, etc.) to predict user viewpoints in subsequent frames to compensate for time (latency) to render, encode (e.g., compress), packetize, transmit, depacketize and decode (e.g., decompress) data.

Predictions made using the tracking information may be exploited to provide more efficient video compression of the video data stream. For example, the predictions may be used to guide motion searching between frames during video encoding, resulting in less data portions (e.g., pixels, blocks) to be searched. Locations of portions in frames to be decoded may be estimated and corresponding matching portions in previously encoded frames may be determined based on the estimated locations.

The predictions may also be used to avoid time consuming and power consuming processes used by conventional methods and systems, such as comparing different encoding modes and/or evaluating coding modes based on computing rate-distortion costs to encode portions of a frame. Accordingly, the predictions may improve encoding efficiency while decreasing encoding processing time and memory bandwidth used to encode the VR data.

Systems, apparatuses and methods are disclosed which update changes to quantization parameters (QP) by weighting the allocation of different QP values based on VR system information to compensate for contradictory QP values.

VR systems, apparatuses and methods described herein may include transmission of A/V data via a network of wireless mediums, a wired medium network or a network having a combination of both wired and wireless mediums. For example, low latency communication channels dedicated to the feedback information and/or the encoded packetized A/V data may include wireless mediums, wired mediums or a combination of both wireless mediums and wired mediums.

While wireless mediums enhance the VR experience by providing for freedom of movement in any direction, the bandwidths of such wireless mediums are limited (compared to the bandwidth of wired mediums) and processing (additional to the processing of data transmitted via wired mediums) of wirelessly transmitted data may include additional latency. The present application discloses systems, apparatuses and methods of encoding A/V data under wireless bandwidth and latency constraints, while minimizing encoder computations, processing times and memory bandwidth. The present application discloses wireless VR systems, apparatuses and methods which efficiently transmit A/V data via wireless mediums, process (e.g., encode/decode data, packetize/de-packetize data) the wirelessly transmitted data and store the data to provide a realistic VR experience with high visual quality and low latency.

Figure 1:
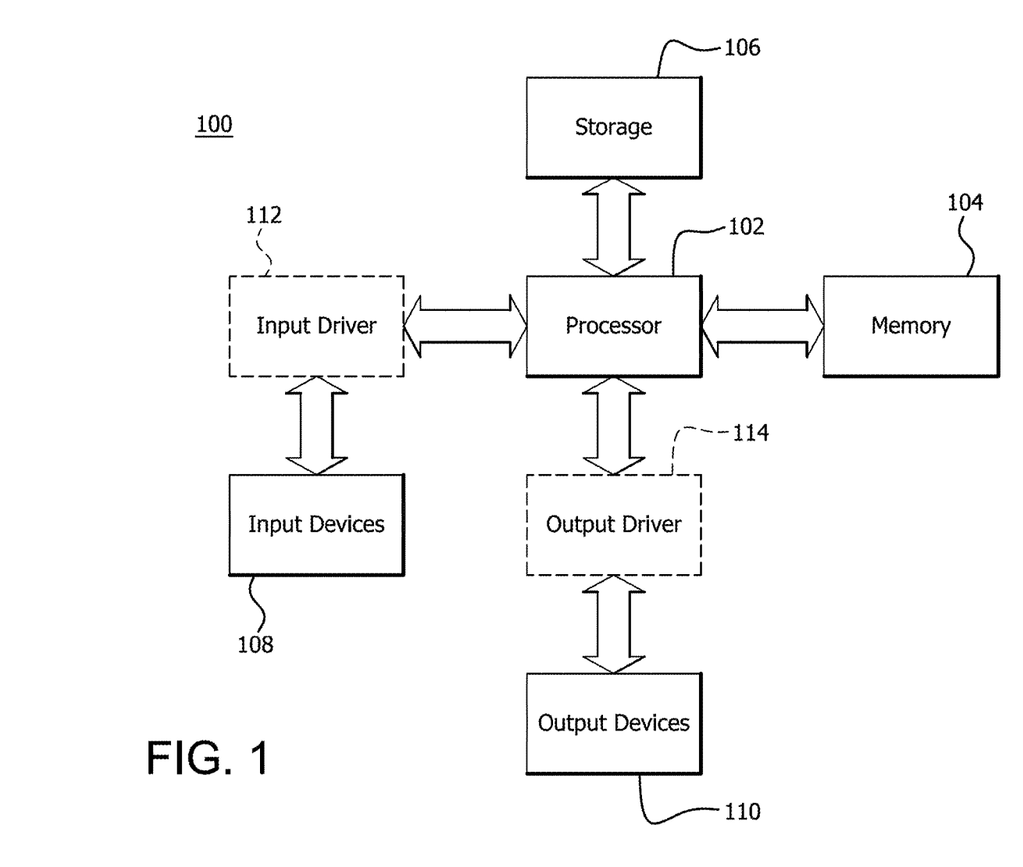
FIG. 1 is a block diagram of an example device in which VR systems, apparatuses, and methods disclosed herein may be implemented.

FIG. 1 is a block diagram of an example device 100 in which VR systems, apparatuses, and methods disclosed herein may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
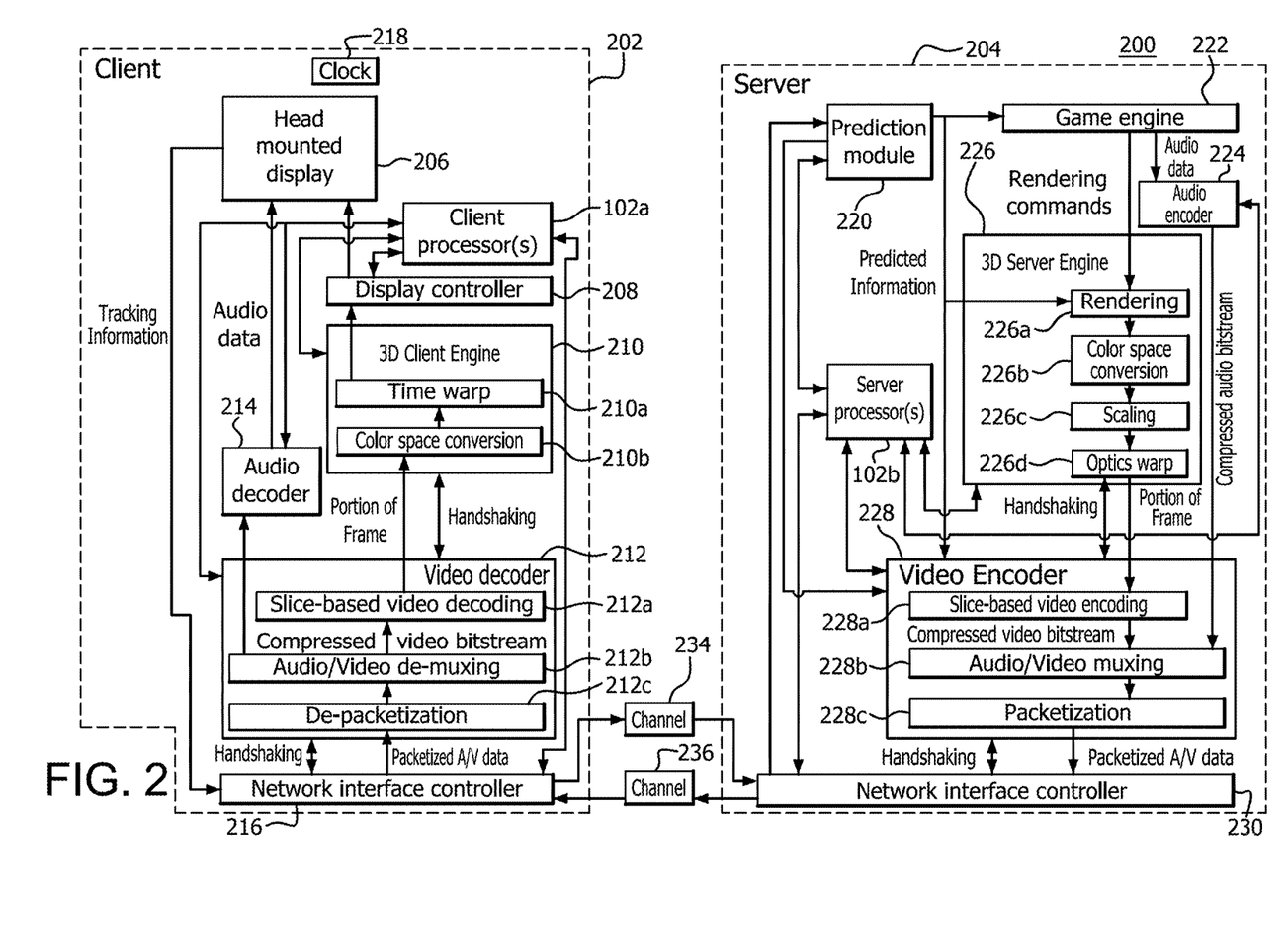
FIG. 2 is a block diagram illustrating an exemplary interconnection and information flow in an exemplary VR system.

FIG. 2 is a block diagram illustrating an exemplary interconnection and information flow in an exemplary VR system 200. As shown in FIG. 2, the system 200 may include a VR client 202 and a VR server 204.

The VR client 202 and the VR server 204 may each include one or more of the components shown in FIG. 1.

Some components, as described in more detail below, may perform tasks via hardware components, software components or a combination of hardware components and software components. Each of the client components may be part of a single device, for example a head mounted display device. Components may also be part of separate devices. Each of the server components may be part of a single device or may be part of separate devices.

Exemplary components may implemented as part of, or used with, systems or devices capable of rendering video data, video encoding and transmitting 3D content, such as for example, PCs, home server, game consoles (e.g., XBOX consoles or PLAYSTATION consoles).

Example components described herein may also be implemented as part of, or used with, systems or devices (e.g., a head mounted display (HMD)) capable of displaying video data or interfacing with systems or devices, such as for example, smartphones, laptops, and the like.

Referring to FIG. 2, the client 202 may include HMD 206, a display controller 208, a 3D client engine 210, a video decoder 212 and an audio decoder 214. The client 202 may include a network device (e.g., receiver, transmitter, and transceiver), such as a client network interface controller (NIC) 216, for transmitting information and/or receiving information over one or more networks (e.g., local area network), including wired (e.g., Ethernet) or wireless networks (e.g., via WiFi, Bluetooth, and other wireless standards). The client may also include one or more client processors 102a, which may, for example, include one or more CPUs and/or one or more GPUs. The one or more processors 102a may be in communication with memory, such as memory 104. Each of the client components may be housed in a single device (e.g., device mounted to the head of a user). Client components may, however, be included in separate devices.

The head mounted display (HMD) 206 may be removably mounted on the head of a user (not shown). The HMD 206 may be mounted in a helmet, goggles or other mounting device. The HMD 206 may include a display (e.g., display monitor) configured to display images to a user (not shown). The monitors may include any of a variety of displays, such as liquid crystal displays (LCDs), electroluminescent displays, electrophoretic displays, field emission displays, light emitting diode (LED) displays, plasma displays, vacuum fluorescent displays (VFDs), and virtual retinal displays (VRDs).

The HMD 206 may be mounted in proximity to the user such that a portion of the display is aligned with a portion (e.g., eyes, portion of eyes (e.g., pupils)) of the user and the alignment is maintained or substantially maintained when the head (or other body parts) of the user moves during use. The HMD 206 may include audio providing components (e.g., headphones) configured to provide audio to the user. The audio providing components may also be separate from the HMD 206. The HMD 206 may include a separate monitor for each eye, or a single monitor for both eyes. Images may be superimposed on a real-world view, as part of an augmented reality or mixed reality display.

The HMD 206 may also include one or more sensors (not shown) configured to sense tracking information, such as head or eye tracking information (e.g., head position, head orientation and eye gaze point). One or more of the sensors may be also separate from the HMD 206. The HMD 206 may also include a transmitter configured to transmit the sensed tracking information as feedback information to server 204 to predict a user viewpoint of a next frame of a sequence of frames of video data to be displayed. The client 202 may also include a transmitter separate from the HMD 206 configured to transmit the sensed tracking information as feedback information to server 204.

The client 202 may include a system clock 218 to facilitate synchronization of the client 202 and the server 204. For example, the feedback information may include time stamp information indicating a time (e.g., point in time, time interval) via system clock 218 when the feedback information is sensed at the client 202. The time stamp may include a sequence of characters or encoded information. The time stamp may include a time code having a sequence of generated codes (e.g., numeric codes). The time stamp or time code may be generated at regular intervals, upon demand or upon the occurrence of an event. The clock 218 may be separate from, or part of, the HMD 206. The clock 218 may be in communication with sensors and/or client processor(s) 102*a* to provide the time stamp for the sensed feedback information.

Display controller 208 may receive video signals from the 3D client engine 210 and display video to HMD 206 for display. Display controller 208 may comprise one or more of its own processors dedicated to receiving decoded video signals and providing the video signals for display and may also communicate with processor(s) 102*a*. Display controller 208 may leverage the one or more processors 102*a* to provide the video signals for display.

The 3D client engine 210 may include a portion of software, having instructions and/or commands, which may execute on a processor or leverage multiple processors 102*a*, such as one or more CPUs and one or more GPUs. The 3D client engine 210 may include a time warp portion 210*a* and a color space conversion portion 210*b*. The 3D client engine 210 may be a portion of software that runs on or leverages one or more processors 102*a*, such as CPUs and GPUs. The 3D client engine 210 may receive decoded information from decoder 212 and provide information to display controller 208. In some implementations, the 3D client engine 210 may be implemented as an engine capable of asynchronously executing graphics and compute functions.

The video decoder 212 and the audio decoder 214 decode A/V data received from network interface controller 216. The video decoder 212 and the audio decoder 214 may be implemented in hardware or software. A/V data may be decoded via software and hardware. The video decoder 212 may include a slice-based video decoding portion 212*a*, an A/V de-muxing portion 212*b* and a de-packetization portion 212*c*, each of which may be implemented in software or hardware. The de-muxing and de-packetization may minimize latency and the load on client processor(s) 102*a* (e.g., CPU).

The client NIC 216 may be a device used to connect one or more client components (e.g., client processor(s) 102*a*, video decoder 212, and audio decoder 214) to one or more server components (e.g., server processor(s) 102*a*, video encoder 212, and audio encoder 224) via one or more wireless networks using low latency channel 236 dedicated to the A/V data and low latency channel 234 dedicated to the tracking information. Separate client NICs may also be used to communicate via the low latency channel 236 and the low latency channel 234. Client NICs may also be used to communicate the A/V data and tracking information over wired networks or a combination of wired and wireless networks.

The video decoder 212 may implement handshaking protocols with the 3D client engine 210 and client NIC 216. The video decoder 212 may interface with NIC 216 and receive the encoded A/V data via DMA.

Handshaking may, however, be performed between client processor(s) 102*a* (e.g., CPU) and client NIC 216. For example, A/V de-muxing and de-packetization may be performed separate from the video decoder 212, such as via software using client processor(s) 102*a* (e.g., CPU). Accordingly, handshaking may occur between client processor(s) 102*a* (e.g., CPU) and client NIC 216 and without DMA.

The server 204 may include a prediction module 220, a game engine 222, an audio encoder 224, a 3D server engine 226 and a video encoder 228. The server 204 may also include a device (e.g., receiver, transmitter, and transceiver, such as a client network interface controller (NIC) 230, for transmitting information and/or receiving information over one or more networks (e.g., local area network), including wired (e.g., Ethernet) or wireless networks (e.g., via WiFi, Bluetooth, and other wireless standards). The server 204 may also include one or more server processor(s) 102*b*, which may include may include, for example, one or more CPUs and/or and one or more GPUs.

The prediction module 220 may receive (e.g., via NIC 230 or a separate NIC dedicated to channel 234) the feedback information from client 202. The server 204 may also include a receiver, separate from the prediction module and in communication with other server components (e.g., prediction module 220, server processor(s) 102*b* and game engine 222), that is configured to receive the feedback information from client 202. The prediction module 220 may be configured in software, hardware or a combination of software and hardware to receive the feedback information from the client 202, such as the head and/or eye tracking information via low latency channel 234 dedicated to the feedback information. The prediction module 220 may provide prediction information (e.g., information indicating where the viewpoint of the user will be in the next frame) to the game engine 222 and the 3D engine 226. The prediction module 220 may utilize the time stamp information indicating a time when the tracking information is sensed at the client 202.

Game engine 222 may include a plurality of libraries, such as software development kits (SDKs). Games or simulations may be developed on the game engine 222 to provide applications that include rendering instructions/commands to render (e.g., frame rendering) data as images for display. The applications may run on a processor or leverage multiple processors 102*b* to provide the rendering instructions/commands to the 3D server engine 226 using the predicted information from prediction module 220. The game engine 222 may, for example, make different decisions on what data should be rendered, generate outputs (e.g., frames) based on collected user inputs, and run simulations to detect events, such as collisions.

The 3D server engine 226 may execute the rendering instructions/commands using a processor or leverage multiple processors 102*b*, such as CPUs and GPUs to generate the next frame or portion of the next frame of video. In some implementations, the 3D server engine 226 may be implemented as an engine capable of asynchronously executing graphics and compute functions. The 3D server engine 226 may use the prediction information from the prediction module 220 to generate the next frame or portion of the next frame of video. As shown in FIG. 2, the 3D server engine 226 may include a rendering portion 226a to render the next frame or the portion (e.g., slice, block, macro block, and field) of the next frame. The 3D server engine 226 may also include a color space conversion portion 226b (e.g., to convert the next frame or the next frame portion represented one color space to another color space), a scaling portion 226c (e.g., to scale the next frame or the next frame portion) and an optics warp portion 226d (e.g., to correct image distortion). One or more of portions, such as portions 226b through 226d, may not be included.

The audio encoder 224 may encode audio data received from game engine 222. The audio encoder 224 may be implemented in hardware or software. Audio may be encoded via software encoding and hardware encoding.

The video encoder 228 may receive prediction information from prediction module 220, audio data from audio encoder 224 and video data from 3D server engine 226 and provide encoded video data (either 3D or non-3D video) and/or audio data to the server NIC 230. The video encoder 228 may include a slice-based encoding portion 228a, an A/V muxing portion 228b to provide A/V synchronization and a packetization portion 228c to format the video data into packets (e.g., IP packets) for transporting over a wireless network. Different types of packets may be used according to different types of protocols. The video data may be sliced into smaller packets (e.g., packetized elementary stream (PES) packets) and then loaded into larger packets, such as IP packets. The multiplexing and packetization performed using A/V muxing portion 228b and packetization portion 228c of video encoder 228 may minimize latency and the load on server processor(s) 102b (e.g., CPU).

The video encoder 228 may implement handshaking protocols with the 3D server engine 226 and server NIC 230, as described in more detail below. The video encoder 228 may interface with NIC 230 and provide the encoded A/V data via DMA.

Handshaking may, however, be performed between server processor(s) 102b (e.g., CPU) and server NIC 230. For example, A/V multiplexing and packetization may be performed separate from the video encoder 228, such as via software using server processor(s) 102b (e.g., CPU). Accordingly, handshaking may occur between server processor(s) 102b (e.g., CPU) and server NIC 230 and without DMA.

The video encoder 228 may be implemented in hardware or software. Video may be encoded using both software and hardware components. The video encoder 228 may include one or more processors dedicated to the video decoder 228. The video encoder 228 may also encode the data using or leveraging the one or more server processors 102b.

The server NIC 230 may be a device used to connect one or more server components (e.g., server processor(s) 102b, video encoder 228, and audio encoder 224) to one or more other server components (e.g., server processor(s) 102b, video encoder 212, and audio encoder 224) via one or more wireless networks using low latency channel 236 dedicated to the A/V data and low latency channel 234 dedicated to the tracking information. Separate server NICs may also be used to communicate via the low latency channel 236 and the low latency channel 234. Server NICs may also be used to communicate the A/V data and tracking information over wired networks or a combination of wired and wireless networks.

The feedback information may be sent wirelessly from the client 202 to the server 204 via the low latency wireless channel 234 dedicated to the feedback information 234 to provide a low latency path. Further, information, such as A/V information may be sent wirelessly from the server 204 to the client 202 via a wireless channel 236 dedicated to the A/V information to provide a low latency wireless medium. The feedback information and the A/V information may be wirelessly transmitted according to any of a variety of wireless protocols, such as for example, Wi-Fi (e.g., IEEE 802.11 protocols, such as 802.11ac, 802.11ad and the like), ZigBee (IEEE 802.15.4-2006), Radio Frequency for Consumer Electronics (RF4CE), 6LoWPAN, ONE-NET, Bluetooth, wireless USB, ANT and Infra-red Data Association (IrDA). Further, the client 202 and the server 204 may each include a wireless transmitter, such as output driver 114, and a receiver, for transmitting the feedback information and the A/V information according to a corresponding wireless protocol.

An example flow of displaying video data using the system 200 is shown in FIG. 2. For example, as shown in FIG. 2, the prediction module 220 receives the feedback information from the client 202, such as the head and/or eye tracking information via a low latency channel 234 dedicated to the feedback information. The feedback information may include time stamp information indicating a time via system clock 218 when the feedback information is sensed at the client 202. The prediction module 220 makes predictions (e.g., where the viewpoint of the user will be in the next frame) based upon the feedback information and provides prediction information corresponding to the prediction to the game engine 222 and the 3D engine 226. The prediction module 220 may utilize the time stamp information to provide the prediction information.

Game engine 222 receives the predicted information from prediction module 220 and provides rendering instructions/commands to the 3D server engine 226 to render video data. Game engine 222 also provides audio data to audio encoder 224.

The 3D server engine 226 receives the rendering commands from the game engine 222 and the prediction information from the prediction module 220 and generates data using the rendering commands and the prediction information. For example, the rendering portion 226a renders data (e.g., images, in stereoscopic view or non-stereoscopic view). As shown in FIG. 2, the color space conversion portion 226b performs color space conversion, the scaling portion 226c performs scaling of the video and the optics warp portion 226d performs image/optics warping to the video data. Color space conversion, scaling and image/optics warping may be performed in any order, based on a plurality of factors including processing time, memory traffic and video quality. One or more of the functions indicated at blocks 226b through 226d may not be performed. Processing of video data using system 200 may also be performed using none of the functions indicated at blocks 226b through 226d, i.e., a different process may be performed.

The audio and video data are encoded, transmitted, for example wirelessly, and decoded with low latency by utilizing handshaking protocols between hardware components and/or software components (e.g., portions of code), such as for example, between (i) 3D server engine 226 and video encoder 228; (ii) video encoder 228 and server NIC 230; (iii) video decoder 212 and client NIC 216; and (iv) a 3D client engine 210 and video decoder 212. An exemplary method of utilizing these handshaking protocols is now described.

The 3D server engine 226 stores the video data in one or more buffers (not shown), which may be implemented, for example as on-chip buffer and/or external buffers. The video encoder 228 reads the data stored by the 3D server engine 226 in the one or more buffers. The video encoder 228 performs handshaking with 3D server engine 226. For example, when one or more of the tasks (e.g., rendering of a portion of the next frame) is completed, the 3D server engine 226 may indicate to the video encoder 228 that the rendering is completed and the portion of the next frame is available for encoding to decrease latency between the video encoder 228 and the 3D server engine 226.

The handshaking may be used to provide buffer management (e.g., prevent or limit underflow and overflow of the one or more buffers). The input buffer rate or the output buffer rate may also be adjusted based on the handshaking. The handshaking may also be used to efficiently synchronize the encoded video data with the encoded audio data at A/V muxing portion 228b.

In response to receiving the indication from the 3D server engine 226, the video encoder 228 may encode the portion of the next frame. The video encoder 228 may encode the video on a per slice basis at portion 228a. The video encoder 228 may also encode different portions (e.g., one or more macro blocks) of the video bit stream at a time. The video encoder 228 synchronizes the audio and video data of the encoded slice and formats the encoded A/V data into IP packets.

The video encoder 228 may encode the image in stereoscopic view. During stereoscopic encoding, the video encoder 228 may reference the previous frame of the same view and the same frame of a different view for both frame sequential mode or left and right eye view. The video encoder 228 may also encode the image in non-stereoscopic view. Leveraging of proprietary time warp data received from the client 202 may be implemented for encoding guidance.

The video encoder 228 may interface with server NIC 230 via DMA and transfer the packetized data to the server NIC 230 without additional processor involvement to reduce latency. Each of the game engine 222, the audio encoder 224, the server 3D engine 226 and the video encoder 228 may run on or leverage one or more processors 102b, which may include CPU(s) and GPU(s) to perform any of the functions described herein.

The server NIC 230 transmits the data wirelessly from the server 204 to the client 202 via a wireless channel 236 dedicated to the A/V information to provide a low latency wireless medium. Client NIC 216 receives the encoded A/V data from the VR server 204. The client NIC 216 interfaces with the video decoder 212 and transfers the A/V IP packets via DMA to the video decoder 212 without additional CPU involvement.

The video decoder 212 depacketizes the IP packets at portion 212c and de-muxes the A/V data at 212b. The compressed audio data is decoded by audio decoder 214 and the compressed video data is decoded (e.g., slice level video decoding) at portion 212a. The audio decoder 214 interfaces with the client NIC 216, de-packetizes the IP packets and extracts and decodes the audio data.

The 3D client engine 210 receives the decoded bit stream from the video decoder 212, which may include any number of portions of decoded video (e.g., a frame or a portion of the frame). The 3D client engine 210 may perform handshaking with the video decoder 212. The 3D client engine 210 may also perform handshaking with the display controller 208. The 3D client engine 210 may, after a pre-determined number of slices is decoded, fetch and run a display shader to perform real time and/or image warping (via time warp portion 210a) on the data decoded by the video decoder.

The video decoder 212 performs handshaking with 3D client engine 210 to provide buffer management, efficiently synchronize the encoded video data with the encoded audio data at A/V de-muxing portion 212b and decrease latency between the video decoder 212 and the 3D client engine 210. For example, when a portion of the video frame or the entire video frame is decoded, the video decoder 212 may indicate to the 3D server engine 226 that the video data is decoded and the decoded video information is available to be fetched. In response to receiving the indication from the video decoder 212, the 3D client engine 210 runs a display shader at color space portion 210b and performs time and/or image warping at portion 210a on the decoded video data.

The display controller 208 receives the decoded video data from the 3D client engine 210 and provides video to the HMD 206 for display and the audio decoder provides the audio data to the HMD 206 for aural presentation. The display controller 208 may, after pre-determined amount of time, fetch and display the data decoded by the video decoder 212 and image warped by the 3D client engine 210. The data may be keyed into a hardware real time display shader framework. The pre-determined amount of time may, for example, range from a time to decode a portion of a frame to a time to decode a frame. The amount of time may be determined by a number of factors, including the bitrate and resolution capabilities of the video encoder 228 and video decoder 212.

The real time and/or image warping via the front-buffer display shader may be performed by 3D client engine 210 before or after color space conversion via portion 210b based on different factors, such as processing time, memory traffic and video quality. The display controller then provides video data for display.

Movements (e.g., head movements, eye movements) of the user, responsive to being provided the video data and audio data, may be sensed as feedback information (e.g., high frequency (e.g., 1 KHz+) tracking information) and sent back to the server 204 through the same or different channel to minimize the impact of the video/audio data transferred from the server 204.

VR systems, apparatuses and methods may also include texture space rendering. For example, a VR server 204 component (e.g., game engine) may generate rendered frames describing a texture atlas. The VR client 202 may generate stitched left/right views by rendering a scene, while using decoded frames as texture, providing an efficient rendering pass because the server 204 has already included the shading information in the texture atlas.

Tracking information (e.g., eye gaze point information, head position and orientation) used to predict the user viewpoint of a next frame may be used to provide efficient and reliable processing video data of VR applications. The tracking information may also be combined with other information (determined from components of the exemplary VR systems and apparatuses described herein) to provide efficient and reliable processing of video data of VR applications.

Figure 3:
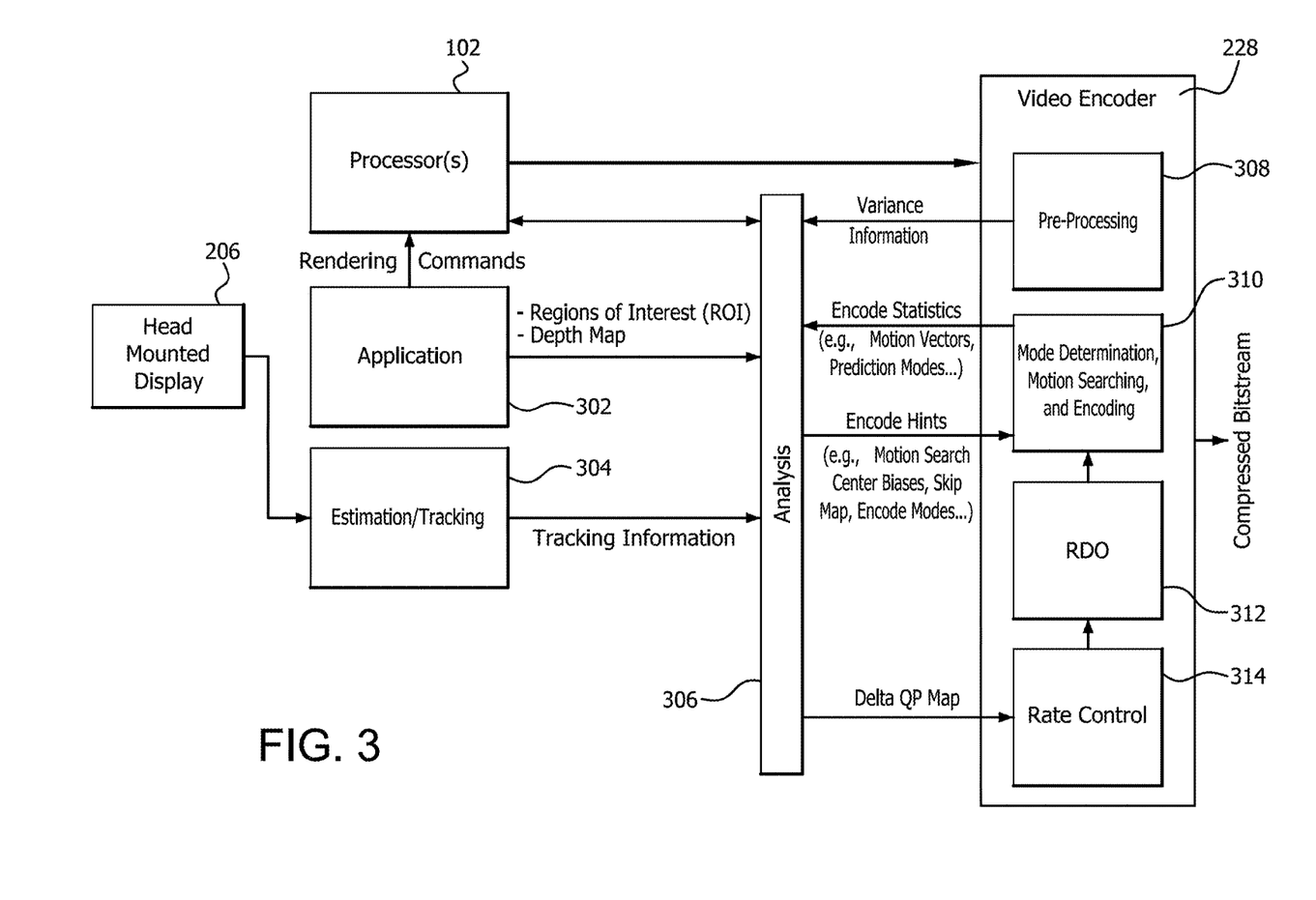
FIG. 3 is a block diagram illustrating an exemplary interconnection and information flow of an exemplary portion of the VR system shown in FIG. 2.

FIG. 3 is a block diagram illustrating an example interconnection and information flow of a portion of the VR system 200 shown in FIG. 2. As shown in FIG. 3, the VR system 200 includes HMD 206, processor 102 (e.g., server processor(s) 102b shown in FIG. 2), application 302, an estimation/tracking component 304, an analysis component 306 and a video encoder 228. The application 302, the estimation/tracking component 304, the analysis component 306 and the encoder 228 may each leverage one or more processors 102 (e.g., CPU, GPU, APU) to perform various functions described herein.

The application 302 may comprise games or simulations (e.g., developed on game engine 222 shown in FIG. 2) that include rendering instructions/commands to render (e.g., frame rendering) A/V data as images for display. For example, the application 302 may provide depth information (e.g., depth map) and region of interest (ROI) information (or portion of interest) to the analysis component 306. ROI information may, for example, include portions of frames to be encoded, portions in current frames, co-located portions and/or portions around co-located portions in reference frames. The application may include video data corresponding to images captured by a camera. Camera information, such as position and/or orientation of the camera in space relative to one or more objects in the images captured by a camera, may be provided by the application 302 to the analysis component 306.

The estimation/tracking component 304 may use sensed tracking information, such as head or eye tracking information (e.g., head position, head orientation and eye gaze point) described above with regard to FIG. 2 to estimate movement (e.g., movement of user's gaze point, movement of the HMD) over time and predict the user's viewpoint of subsequent frames of video data to be displayed.

The encoder 228 may include pre-processing component 308, mode determination, motion searching and encoding (MME) component 310, rate-distortion cost (RDC) component 312 and a rate control component 314. The RDC component 306 may be used determine a cost between the rate distortion (RD) indicating a loss of video quality, versus the cost to encode, such as the amount of data (e.g., number of bits) to encode a portion.

The analysis component 306 may be separate from and in communication with the prediction module 220 (shown in FIG. 2) or may be a part of the prediction module 220. The analysis component 306 may combine information (e.g., depth information, region of interest (ROI) information) received from the application 302, tracking information received from tracking information component 304, encoding statistics (e.g., motion vectors, predicted encoding modes) from the motion estimation component 310, stored encoding modes (e.g., prediction mode map) from a storage (e.g., storage 106) and variance information from the pre-processing component 308 to provide encoding information used by the encoder 228, which may, for example, include encoding hints (e.g., motion search center biases, skip map, encoding modes) used by the MME component 310 of the video encoder 228 to predict the motion of each portion of a frame. The encoding information provided by the analysis component 306 may also include pre-determined encoding information used by the MME component 310 to encode one or more portions of a frame, reducing processing times, power consumption and memory bandwidth.

Video compression uses different coding techniques or coding modes to reduce redundancy in video data. Because the difference between frames is typically the result of either movement of a camera or movement of an object in the frame, motion searching is employed to facilitate the encoding of the video data for video compression. Motion searching attempts to predict a current frame in a video stream based on previous and/or future frames by accounting for motion of a camera and/or objects in the video. The prediction includes estimating the motion of portions (e.g., macroblocks) between frames (e.g., between current frame to be encoded and a previously encoded reference frame) by searching for matching portions around co-located portions in the reference frame (i.e., portions at the same location in the reference frame). While motion searching may facilitate reducing the number of bits to be encoded, the process is computationally expensive and resource extensive.

Encoding of the video stream may include intra-frame (I-frame) encoding, in which a frame is encoded without any reference to another frame. Predictions based on I-frame encoding are made based on previously coded portions (e.g., macroblocks) within the frame. Encoding of the video stream may also include inter-frame encoding, in which the current frame is encoded with reference to a previously coded frame, such as a predicted frame (P-frame) and/or a bi-directional predicted frame (B-frame). Different encoding modes (e.g., vertical mode, horizontal mode, planner mode) may be used to encode portions (e.g., macroblocks) of a frame.

The encoding process of a video stream typically includes determining a preferred coding mode to use from a plurality of encoding modes. Determining the preferred coding mode typically includes computing a RDC for each portion based on an amount of distortion and a number of bits to encode each portion of a frame. The preferred mode may then be determined as the mode with the least rate distortion cost. This process of determining the preferred coding mode, however, results in significant power consumption, increased processing time and uses a larger memory bandwidth.

The information specific to VR applications, such as head or eye tracking information may be used to provide more efficient encoding processes using different types of encoding. As described above, encoding information provided from the analysis component 306 to the motion estimation component 310 of the video encoder 228 may be based on the frame or picture type (e.g., I-frame encoding, inter-frame encoding).

For inter-frame encoding, the tracking information can be used to predict a viewpoint of a user in the next frame (e.g., the current frame to be encoded and displayed) as described above with reference to FIG. 2 and portions of the next frame may be rendered at estimated locations in the next frame based on the predicted viewpoint of the user in the next frame. The estimated locations of the portions of the next frame provide an initialization for determining that a portion of the current frame to be encoded corresponds to a matching portion of the previous frame. That is, because the tracking information provides an indication of the locations of portions of the previously encoded frame as well as estimated locations of portions in the next frame, a good initialization of the locations of corresponding portions between frames may be provided by the analysis component 306. For example, the predicted viewpoint of the user may be used to provide an initialization for determining corresponding portions by estimating a particular amount of movement of an object in a particular direction. The location of a portion of a frame representing the object may then be estimated based on the estimated movement. This initialization for determining corresponding portions results in a smaller search areas (e.g., number of pixels, number of blocks) and therefore, decreases the computations for the motion searching process.

The portion of the current frame may then be encoded using the same mode as the mode used to encode the corresponding portion of the previous frame, without determining the best coding mode from a plurality of coding modes.

Different encoding modes may be stored in a prediction mode map. The prediction mode map associates one or more portions of a frame with corresponding predetermined coding modes to be used to encode the portions. That is, each of a plurality of coding modes may be mapped to a corresponding portion of a frame for encoding the corresponding portion of the frame at the estimated location. Accordingly, based on the estimated location of the portion of the next frame based on the tracking information, the encoding information provided to the video encoder 228 may include encoding instructions to encode the portion of the next frame of video data using the coding mode stored in the prediction mode map that is mapped to the portion of the frame at the estimated location.

The encoding information provided to the video encoder 228 may include encoding instructions to skip the stored prediction mode map and encode the portion of the current frame to be encoded using the same coding mode as the coding mode used to encode the corresponding portion of the previous frame. The prediction mode map may also be used to identify the coding mode used to encode the corresponding portion of the previous frame without performing the computations (e.g., computing a RDC) for selecting the best mode.

Figure 4:
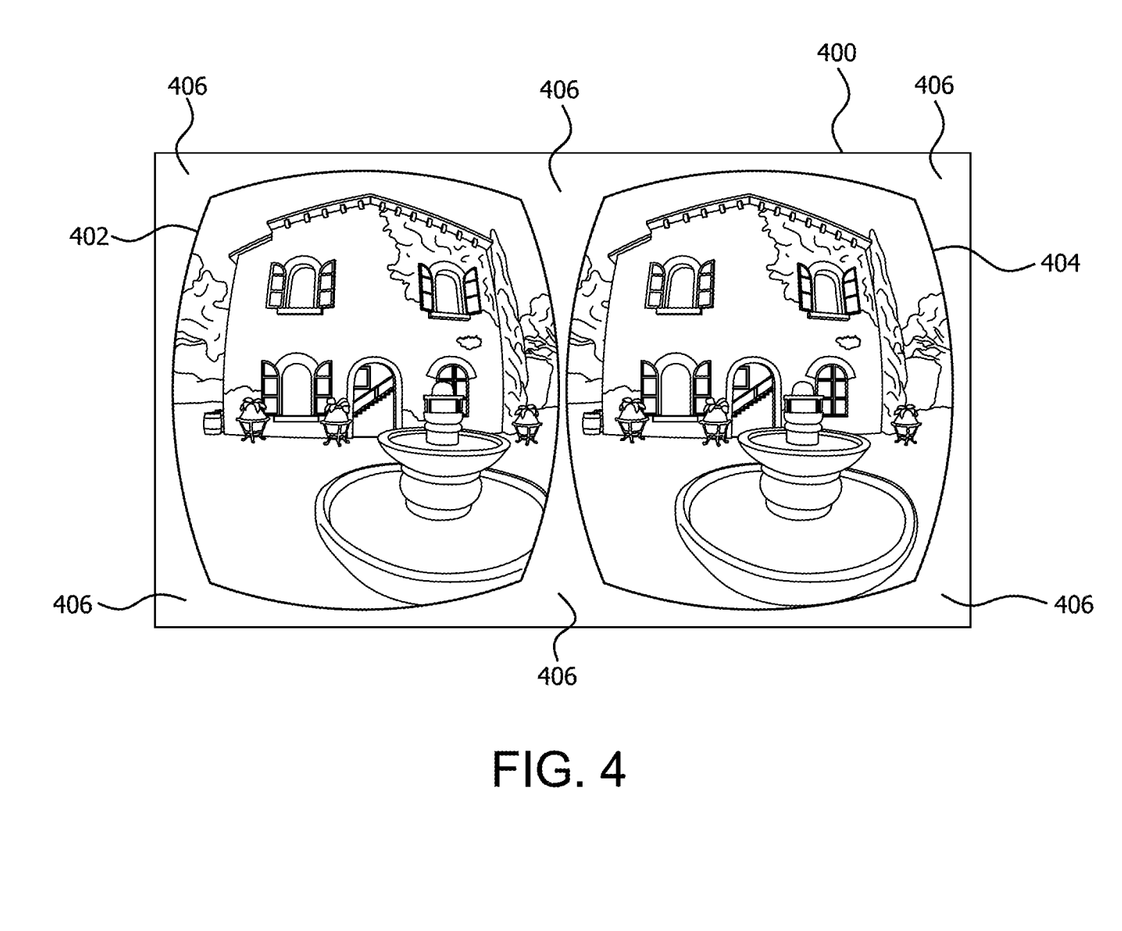
FIG. 4 is an illustration of an exemplary stitched left/right view frame for use with systems, apparatuses, and methods disclosed herein.

FIG. 4 is an illustration of an example stitched view frame 400 having left and right views for use with systems, apparatuses, and methods disclosed herein. The stitched view frame 400 is an example of a frame having a left view 402 and a right view 404, utilizing a stereoscopic process in which two views of an object or objects observed at different angles are viewed together, creating an impression of a third dimension of depth to a user, which may be used for displaying of 3 dimensional (3-D) video of VR applications. As shown in FIG. 4, because objects in the two views 402 and 404 are observed at different angles, the objects in the left view 402 are shown as slightly displaced from the corresponding objects in the right view 404.

Information used with the VR applications, such as depth information for each portion and camera information (e.g., camera matrices indicating position and/or orientation of the camera in space relative to one or more objects in the images captured by a camera) may be used to reduce processing times, power consumption and memory bandwidth associated with processing of the A/V data for VR applications.

Because the two views are views of the same image, a large portion of the two views of the stitched frame 400 may be the same. Portions of the two views may, however, be different due the different viewing angles. For example, parts of an object visible in one view may be hidden (e.g., behind another object) in the other view, and lighting and shadows for some portions may be different. Because a large portion of the two views are the same, the depth information and camera information (e.g., camera matrices indicating angle, position orientation of the camera in space), associated with both views may be used to map corresponding portions (e.g., pixels, blocks, such as macroblocks) between the left and the right views to provide a good initialization of the location of corresponding portions. For example, for each rendered pixel in the left view, a 3D point may be computed using the depth information and the left view camera information. The 3D point may then be re-projected on the right view using the right view camera information. The process may be used for any size portion, such as blocks by considering representative pixels such as the block's barycenter. Because portions in one view may be used as an initialization of the location of corresponding portions in the other view, motion searching around the corresponding portions in the other view and may therefore decrease the amount of searching in the other view.

For non-stereoscopic encoding (e.g., AVC), the complex mode decision process of determining a best coding mode may be performed for each portion of one of the two views (e.g., left view or right view) without performing the process for corresponding portions the other of the two views. Further, the amount motion searching for portions or portions (e.g., macroblocks) between frames (e.g., current frame to be decoded and a reference frame) by searching for matching portions or similar portions (e.g., within a matching threshold) around co-located portions in the reference frame. That is, the mapping between the two views may be exploited to transpose the encode decisions (e.g., prediction decisions, encode partitions, motion vectors) of the one view (e.g., left view or right view) as encode hints to encode the other view. For stereoscopic encoding (e.g., MVC), inter-view mapping may be exploit to guide motion search and mode decisions to accelerate inter views prediction.

As described above with reference to FIG. 3, the encoding information provided by the analysis component 306 may include pre-determined encoding information used by the MME component 310 to encode one or more portions of a frame, reducing processing times, power consumption and memory bandwidth. For example, the analysis component 306 may provide, to the video encoder 228, instructions to encode one or more portions of a frame using a predetermined encoding mode.

As shown in FIG. 4, the stitched view frame 400 also includes an unused portion of the frame 400 comprising unused regions 406. The shape, size and locations of the left view 402 and right view 404 shown in FIG. 4 are exemplary. The number, shape, size and location of the unused regions 406 shown in FIG. 4 are also exemplary. As shown in FIG. 4, the unused regions 406 are regions outside of the left view 402 and the right view 404. On average, unused regions make up about 17% of stitched left/right view frames. Stitched left/right view frames may, however, include unused regions which make up different percentages of the frames.

Although typically each region or portion of a frame of video data is encoded, the unused regions 406 of the stitched left/right view frame 400 are typically black regions which do not include rendered video data. The video quality (e.g., color, shade, definition) of the unused regions 406 in the stitched view frame 400 are of little or no concern with regard to providing a user with a realistic VR experience. Accordingly, any encoding mode may be used to encode the unused regions 406. The analysis component 306 may identify unused regions 406 to be encoded and provide pre-determined encoding instructions to the encoder 228 to encode the unused regions 406 of the frame using any encoding mode.

For example, during both I-frame encoding and inter-frame encoding, the pre-determined encoding instructions may encode the unused regions 406 using a predetermined coding mode, such as a predetermined coding mode stored in the prediction mode map. The prediction mode map may identify a predetermined coding mode associated with an unused region 406 based on the estimated location of the unused region 406 (e.g., estimated due to the same location in each frame). The pre-determined encoding instructions may also include instructions to skip the stored prediction mode map and encode an identified region using, for example, the mode used to encode the previous region. The predetermined encoding instructions may also include an instruction to disable mode determination and encode the unused region 406 with the encoding mode used to decode the previous region.

Accordingly, the encoder 228 may encode the unused region 406 while avoiding the determination of the best encoding mode from a plurality of encoding modes during the video compression process.

The tracking information (e.g., eye gaze point information, head position and orientation, camera position and orientation) used to predict a user viewpoint of a next frame may be combined with other information (determined from components of the exemplary VR systems and apparatuses described herein) to provide efficient and reliable processing and displaying of video data of VR applications. For example, tracking information may be combined with depth information and ROI information (e.g., received from the application 302), variance information (e.g., received from the pre-processing component of the encoder 228) and visual falloff acuity information.

Figure 5:
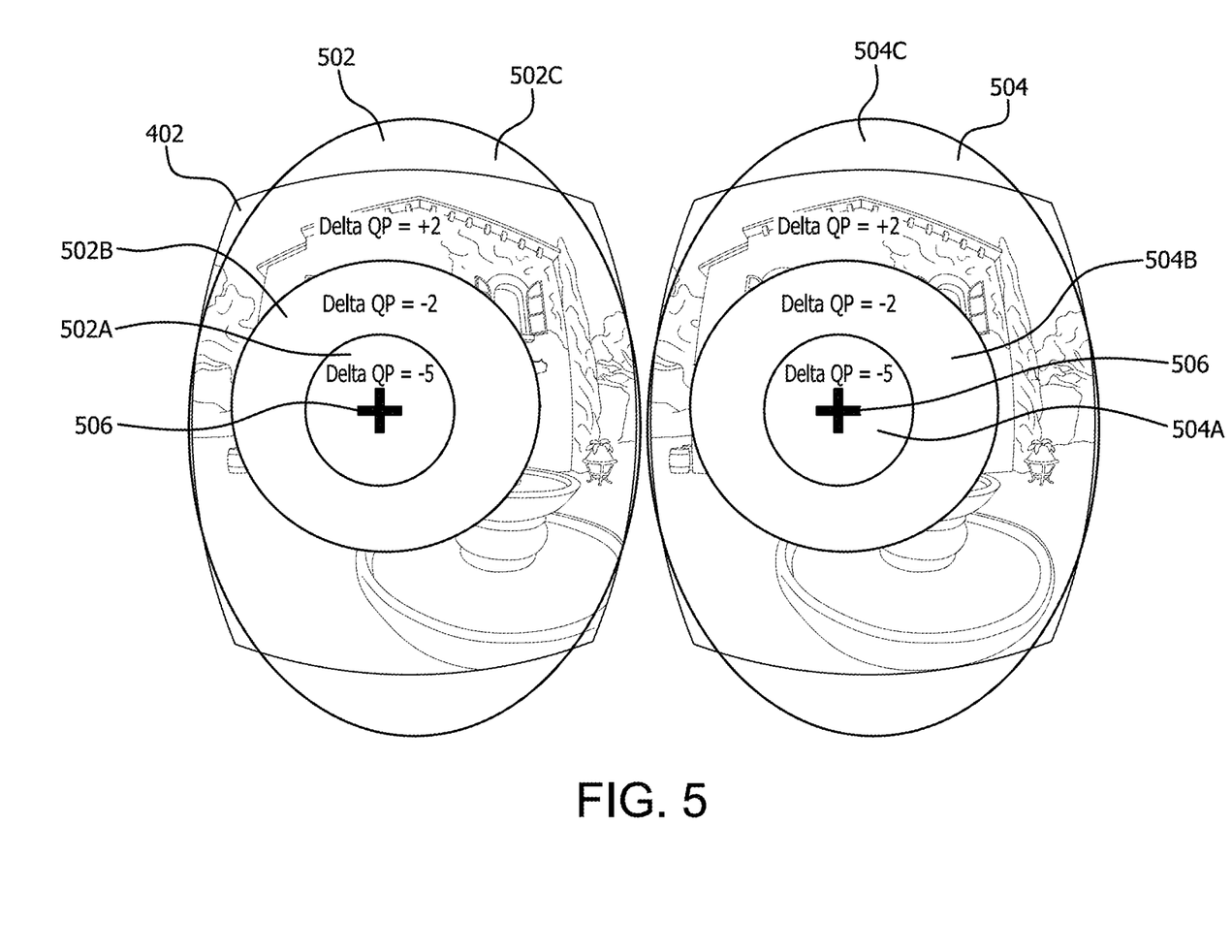
FIG. 5 is an illustration of exemplary quantization parameter (QP) allocation areas superimposed over the left and right views of the exemplary stitched view frame shown in FIG. 4.

FIG. 5 is an illustration of exemplary quantization parameter (QP) maps 502 and 504 superimposed over and having regions characterized by their proximity to a user eye gaze point 506 and corresponding to portions (e.g., pixels, blocks) of the left and right views 402 and 404, respectively, of the exemplary stitched view frame 400 shown in FIG. 4. As shown in FIG. 4, the QP map 502 includes map region 502A corresponding to left view regions closest to the user's gaze point 506 (i.e., gaze point of the left eye), region 502C corresponding to left view regions of the visual periphery of the user's gaze point 506 of the left eye and region 502B corresponding to left view regions between the visual periphery regions and the regions closest to the user's gaze point 506 of the left eye. The QP map 504 superimposed over the right view 404 includes map region 504A corresponding to right view regions closest to the user's gaze point 506 (i.e., gaze point of the right eye), region 504C corresponding to right view regions of the visual periphery of the user's gaze point 506 of the right eye and region 504B corresponding to right view regions between the visual periphery regions and the regions closest to the user's gaze point 506 of the right eye. The size, shape, and position of the QP maps 502 and 504 as well as the size, shape, position and number of map regions shown in FIG. 5 is merely exemplary.

The analysis component 306 may allocate different QP values used to encode portions of the frame according to corresponding map regions 502A-502C and 504A-504C based on ROI information and depth information (e.g., received from the application 302), the user gaze point information (e.g., received from the estimation/tracking component 304) and variance information (e.g., received from the pre-processing component of the encoder 228). A change to a QP (hereinafter ΔQP) map may then be updated by weighting the allocation of the different QP values based on the information to compensate for contradictory QP values. The rate control component 314 may use the information in the ΔQP map received from the analysis component 306 to update the QP determined for each corresponding region (e.g., Macroblock), CTU) of the video frames.

Figure 6:
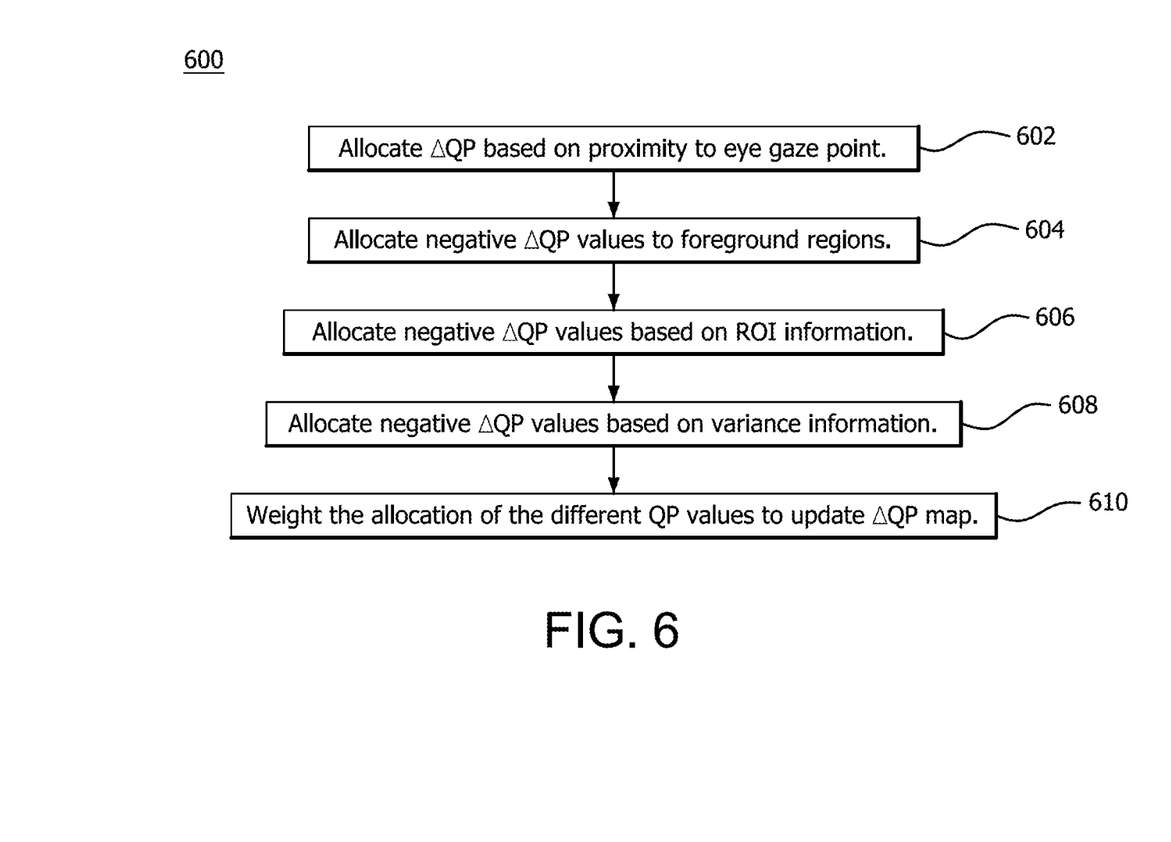
FIG. 6 is a flow diagram illustrating a method of providing a ΔQP to encode portions of a frame of video.

FIG. 6 is a flow diagram illustrating a method 600 of updating a ΔQP of a portion of a frame of video data to encode the portion of the frame of video data. As shown at 602 of FIG. 6, the method 600 may include allocating: (i) negative ΔQPs to regions (e.g., 502A, 502B, 504A and 504B) corresponding to portions of the left and right views close to the eye gaze point (identified using the tracking information) causing the rate control component 314 of the video encoder 228 to compute the updated QP at a higher bitrate and provide a better video quality; and (ii) positive ΔQPs to regions (e.g., 502C and 504C) corresponding to portions of the left and right views on the visual periphery causing the rate control component 314 of the video encoder 228 to compute the updated QP at a lower bitrate and at a lower video quality. For example, as shown in FIG. 5, larger negative ΔQP values (e.g., ΔQP=−5) may be allocated to regions 502A and 504A and smaller negative ΔQP values (e.g., ΔQP=−2) may be allocated to regions 502B and 504C. Positive ΔQP values (e.g., ΔQP=+2) may be allocated to regions 502C and 504C. The ΔQP values shown in FIG. 5 are merely exemplary. Further, ΔQP values allocated for left view regions may be different than the ΔQP values allocated for corresponding right regions.

As shown at 604 of FIG. 6, the method 600 may include allocating negative ΔQP values to foreground regions corresponding to portions of the left and right views using the depth information. For example, the same warp process applied to the rendered left 502 and right views 504 to compensate for lens distortion may be applied to their associated depth maps. The depth maps, after distortion and stitching, may then be used to estimate the depth of each MB/CTU. Negative delta ΔQP values may be associated with MBs or CTUs close the camera and positive delta ΔQP values may be associated with MBs/CTUs further from the camera.

As shown at 606 of FIG. 6, the method 600 may include allocating negative ΔQP values to regions corresponding to portions of the left and right views indicated by the application 302 as a ROI (or portion of interest).

As shown at 608 of FIG. 6, the method 600 may include allocating negative delta ΔQP values to smoother regions (e.g., lower variance MBs/CTUs) and positive ΔQP values to more textured areas. The allocation may be based on variance information provided by pre-processing component 308. This allocation may compensate for more sensitivity to smooth areas (e.g., blockiness) than more textured areas by the human visual system.

The information used to allocate ΔQP values described above in blocks 602-606 of method 600 (e.g., information, such as gaze point, depth and variance) information) that is provided to the analysis component 306 may result in contradictory allocation determinations. For example, when a user is gazing at the background, a higher quality display of the background will result in a more realistic VR experience. The background area may, however, be allocated positive ΔQP values and displayed at lower quality.

As shown at 610 of FIG. 6, the method 600 may include weighting the ROI information and depth information (e.g., received from the application 302), the eye gaze point information (e.g., received from the estimation/tracking component 304), variance information (e.g., received from the estimation/tracking component 304) and other information provided by VR components to update the ΔQP map. The updated ΔQP map may compensate for possible contradictory allocation results. For example, the ROI information, depth information, the eye gaze point information (e.g., received from the estimation/tracking component 304) and variance information may be linearly weighted by a process, such as for example, the process indicated by Equation (1) below:

$$\Delta QP_{Final} = \alpha_{Gaze} \Delta QP_{Gaze} + \alpha_{Depth} \Delta QP_{Depth} + \alpha_{Variance} \Delta QP_{Variance} + \alpha_{ROI} \Delta QP_{ROI} + \ldots \quad \text{Equation (1)}$$

Figure 7:
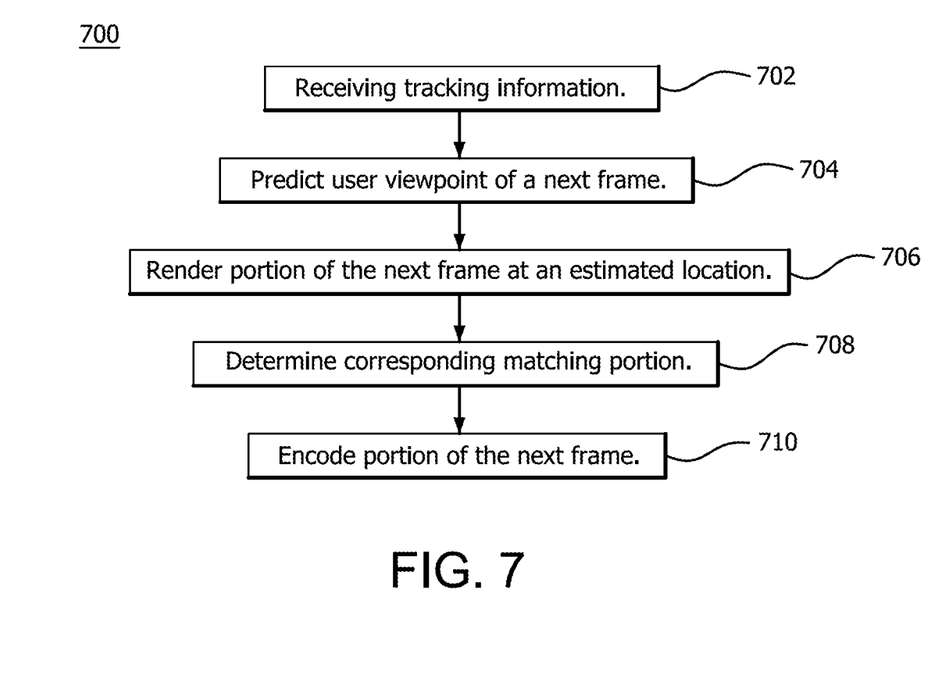
FIG. 7 is a flow diagram of an exemplary method of processing VR content.

FIG. 7 is a flow diagram of an exemplary method 700 of processing VR content. As shown in 702 of FIG. 7, the method comprises receiving tracking information including at least one of user position information and eye gaze point information.

As shown in 704 of FIG. 7, the method comprises using one or more processors (e.g., GPU, ALU) to predict, based on the user tracking information, a user viewpoint of a next frame of a sequence of frames of video data to be displayed.

As shown in 706 of FIG. 7, the method comprises using the one or more processors to render a portion of the next frame of video data to be displayed at an estimated location in the next frame using the prediction.

As shown in 708 of FIG. 7, the method comprises using the one or more processors to determine, based on the estimated location of the portion in the next frame, a corresponding matching portion in a previously encoded frame.

As shown in 710 of FIG. 7, the method comprises using the one or more processors to encode the portion of the next frame of video data.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of processing Virtual Reality (VR) content, the method comprising:
   receiving tracking information including at least one of user position information and eye gaze point information;
   using one or more processors to:
     predict, based on the user tracking information, a user viewpoint of a next frame of a sequence of frames including video data to be displayed,
     estimate, for a video portion in a previously encoded frame, a corresponding location of the video portion in the next frame based on the user tracking information, wherein the video portion in the previously encoded frame is encoded using a first encoding mode;
     render the video portion in the next frame to be displayed at the estimated corresponding location in the next frame;
     identify, based on the estimated corresponding location of the video portion in the next frame, the video portion in the previously encoded frame;
     encode the video portion in the next frame using the first encoding mode; and
     encode another portion of the next frame using a second encoding mode determined from a prediction mode map.

2. The method of claim 1, further comprising using the one or more processors to encode the video portion of the next frame using a coding mode without comparing the coding mode to another coding mode.

3. The method of claim 1, further comprising using the one or more processors to encode the video portion of the next frame using a coding mode without evaluating the coding mode based on a rate distortion (RD) cost to encode the video portion of the next frame.

4. The method of claim 1, further comprising using the one or more processors to use a predetermined coding mode to encode the video portion of the next frame based on the estimated corresponding location of the video portion of the next frame of video data.

5. The method of claim 4, wherein the predetermined coding mode is a coding mode selected from a plurality of predetermined coding modes stored in a prediction mode map, each of the plurality of predetermined coding modes mapped to a corresponding video portion of a frame for encoding the corresponding video portion of the frame at the estimated corresponding location.

6. The method of claim 1, wherein each of the sequence of frames comprises a left view of a frame of video data and a right view of the frame acquired at different angles and displayed together and the encoded portion of the next frame is one of a left view encoded portion and a right view encoded portion,
   the method further comprises using the one or more processors to map the encoded video portion of the next frame from the one of the left view and the right view to a matching video portion in the other of the left view and the right view, and
   encode the matching video portion in the other of the left view and the right view.

7. The method of claim 1, wherein each of the sequence of frames of video data is displayed in a rendered video data region of a viewable area and the viewable area also comprises one or more unused regions each absent of rendered video data, and
   the method further comprises using the one or more processors to encode the one or more unused regions without determining which of a plurality of encoding modes to use to encode the one or more unused regions of the frame.

8. The method of claim 1, further comprising using the one or more processors to:
   allocate different values to QPs used to encode video portions of the next frame according to corresponding map regions characterized by their proximity to a user eye gaze point based on received information comprising at least one of (i) received region of interest (ROI) information, (ii) depth information, (iii) user gaze point information and (iv) variance of texture information;

weight the allocation of the different QP values based on the received information to provide updated QP values for the video portions of the next frame;

update a QP value used to encode the video portion of the next frame the QP based on the weighted allocation of the different QP values.

9. A processor device for processing Virtual Reality (VR) content, the processor device comprising:

memory configured to store data;

one or more processor in communication with the memory and configured to:

receive tracking information including at least one of user position information and eye gaze point information:

predict, based on the user tracking information, a user viewpoint of a next frame of a sequence of frames including video data to be displayed;

estimate, for a video portion in a previously encoded frame, a corresponding location of the video portion in the next frame based on the user tracking information, wherein the video portion in the previously encoded frame is encoded using a first encoding mode;

render the video portion in the next frame to be displayed at the estimated corresponding location in the next frame;

identify, based on the estimated corresponding location of the video portion in the next frame, the video portion in the previously encoded frame; and encode the video portion in the next frame using the first encoding mode; and encode another portion of the next frame using a second encoding mode determined from a prediction mode map.

10. The processor device of claim 9, wherein the one or more processor are further configured to encode the video portion of the next frame using a coding mode without comparing the coding mode to another coding mode.

11. The processor device of claim 9, wherein the one or more processor are further configured to encode the video portion of the next frame using a coding mode without evaluating the coding mode based on a rate distortion (RD) cost to encode the video portion of the next frame.

12. The processor device of claim 9, wherein the one or more processor are further configured to encode the video portion of the next frame using a predetermined coding mode based on the estimated corresponding location the video portion of the next frame.

13. The processor device of claim 12, wherein the predetermined coding mode is a coding mode selected from a plurality of predetermined coding modes stored in a prediction mode map, each of the plurality of predetermined coding modes mapped to a corresponding video portion of a frame for encoding the corresponding video portion of the frame at the estimated corresponding location.

14. The processor device of claim 9, wherein each of the sequence of frames comprises a left view of a frame and a right view of the frame acquired at different angles and displayed together and the encoded video portion of the next frame is one of a left view encoded video portion and a right view encoded video portion, and the one or more processor are further configured to:

map the encoded video portion of the next frame of video data from the one of the left view and the right view to a matching video portion of video data in the other of the left view and the right view, and encode the matching video portion of video data in the other of the left view and the right view.

15. The processor device of claim 9, wherein each of the sequence of frames is displayed in a rendered video data region of a viewable area and the viewable area also comprises one or more unused regions each absent of rendered video data, and the one or more processors are further configured to encode the one or more unused regions without determining which of a plurality of encoding modes to use to encode the one or more unused regions of the frame.

16. The processor device of claim 9, wherein the one or more processor are further configured to:

allocate different values to QPs used to encode portions of the next frame according to corresponding map regions characterized by their proximity to a user eye gaze point based on received information comprising at least one of (i) received region of interest (ROI) information, (ii) depth information, (iii) user gaze point information and (iv) variance of texture information;

weight the allocation of the different QP values based on the received information to provide updated QP values for the portions of the next frame;

update a QP value used to encode the portion of the next frame of video data the QP based on the weighted allocation of the different QP values.

17. A tangible, non-transitory computer readable medium comprising instructions for causing a computer to process Virtual Reality (VR) content, the instructions comprising:

receiving tracking information including at least one of user position information and eye gaze point information;

predicting, based on the user tracking information, a user viewpoint of a next frame of a sequence of frames including video data to be displayed;

estimating, for a video portion in a previously encoded frame, a corresponding location of the video portion in the next frame based on the user tracking information, wherein the video portion in the previously encoded frame is encoded using a first encoding mode;

rendering the video portion in the next frame to be displayed at the estimated location in the next frame;

identifying, based on the estimated location of the video portion in the next frame, the video portion in the previously encoded frame; and encoding the video portion in the next frame using the first encoding mode; and encode another portion of the next frame using a second encoding mode determined from a prediction mode map.

18. The computer readable medium of claim 17, wherein the instructions further comprise encoding the video portion of the next frame using a coding mode without comparing the coding mode to another coding mode.

* * * * *